United States Patent
Wada

[11] Patent Number: 5,942,863
[45] Date of Patent: Aug. 24, 1999

[54] THREE-PHASE BRUSHLESS SERVO MOTOR

[75] Inventor: Zyozi Wada, Yokohama, Japan

[73] Assignee: Matsushita Electric Industrial Co., Ltd., Osaka, Japan

[21] Appl. No.: 08/457,113

[22] Filed: Jun. 1, 1995

[30] Foreign Application Priority Data

Jun. 7, 1994 [JP] Japan .................................. 6-125309

[51] Int. Cl.$^6$ .................................. H02P 5/00; H02P 6/02
[52] U.S. Cl. .................................. 318/254; 318/138; 318/439
[58] Field of Search .................................. 318/138, 245, 318/254, 260–293, 439, 603–696; 250/231.13, 231.16, 214 PR; 360/73, 77, 72

[56] References Cited

U.S. PATENT DOCUMENTS

| | | | |
|---|---|---|---|
| 4,639,798 | 1/1987 | Harrison et al. | 360/73 |
| 4,697,125 | 9/1987 | Goff et al. | 318/254 |
| 4,988,273 | 1/1991 | Faig et al. | 425/145 |
| 5,289,099 | 2/1994 | Bahn . | |
| 5,362,222 | 11/1994 | Faig et al. | 425/145 |
| 5,469,032 | 11/1995 | Otake | 318/439 |
| 5,665,965 | 9/1997 | Durham, III | 250/231.13 |

FOREIGN PATENT DOCUMENTS

| | | |
|---|---|---|
| 0566297A1 | 10/1993 | European Pat. Off. . |
| 2115931 | 9/1983 | United Kingdom . |

*Primary Examiner*—Paul Ip
*Attorney, Agent, or Firm*—Stevens, Davis, Miller & Mosher, L.L.P.

[57] ABSTRACT

In a three-phase brushless servo motor used in various electrical apparatus, Hall element signals are processed so as to provide an artificial encoder. Three-phase Hall elements shifted in phase from each other by 120 degrees in electrical angle are provided inside a brushless motor, and a selection/inversion circuit generates a saw-tooth-wave from output signals of the three-phase Hall elements. A differentiation circuit differentiates the saw-tooth-wave to thereby obtain a signal which is proportional to the rotational speed of the brushless motor and which is used as speed information for motor speed control in a motor driving circuit. Thus, a low-cost and small-sized three-phase brushless servo motor which requires no encoder for rotational speed detection is realized.

9 Claims, 4 Drawing Sheets

(a)

(b)

(c)

A-PHASE  B-PHASE  C-PHASE (d-1)

(d-2)

(d-3)

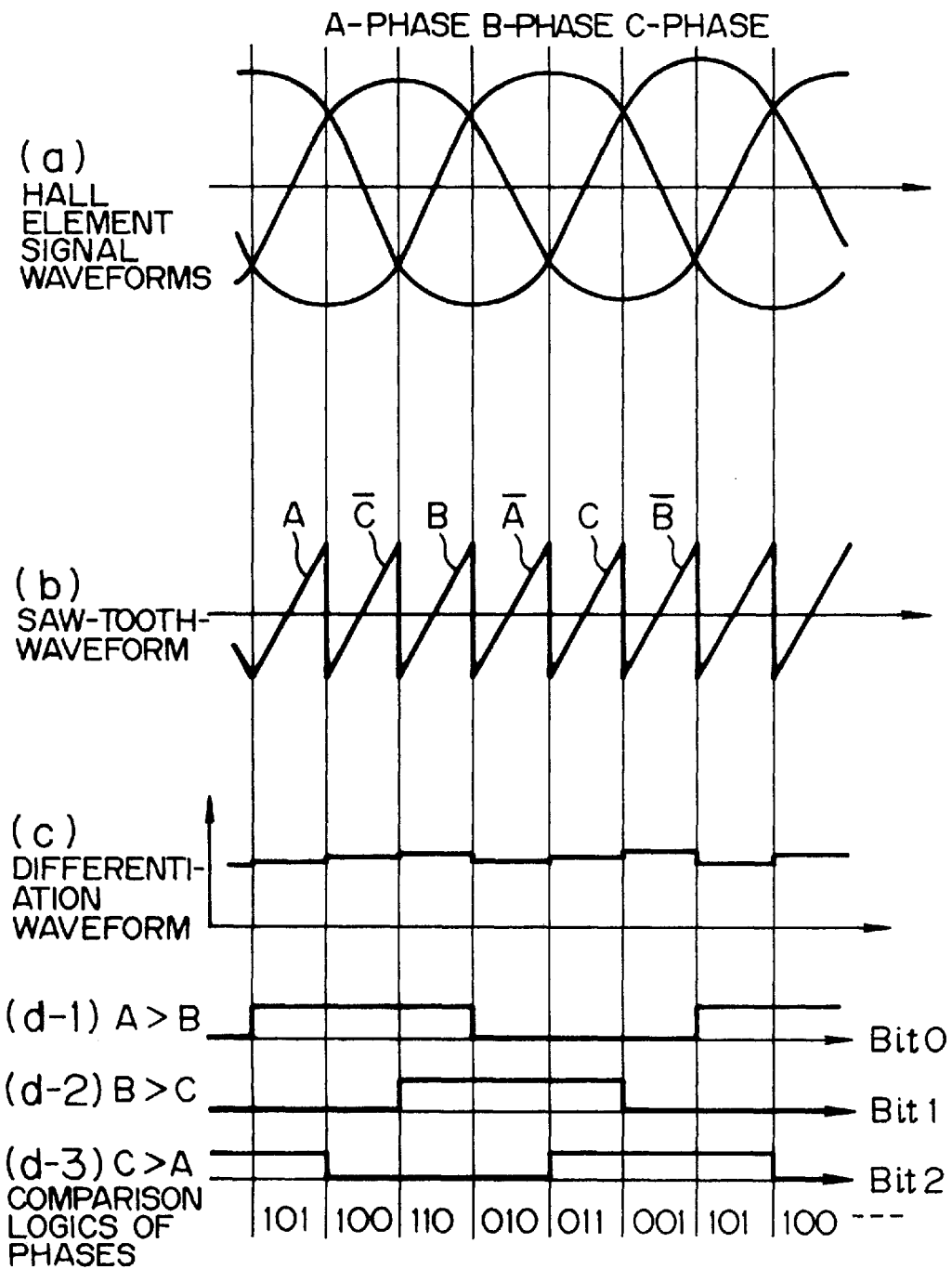

THREE-PHASE BRUSHLESS SERVO MOTOR

BACKGROUND OF THE INVENTION

1. Field of the Invention

The present invention relates to a three-phase brushless servo motor.

2. Description of the Related Art

FIG. 1 shows the configuration of a conventional three-phase brushless servo motor. In FIG. 1, the reference numeral 41 designates the brushless motor; 42, an encoder for detecting the rotational speed; 42a, a rotary disk which rotates in interlinkage with the brushless motor 41; 42b, slits formed in a rotary disk 42a; 42c, a light emission element; 42d, a light detection element; 142, an output signal of the rotational speed detecting encoder 42; and 43, a connector connecting the brushless motor 41 and the rotational speed detecting encoder 42 to each other.

The reference numeral 44 designates a motor driving circuit; and 144, an output of the motor driving circuit 44 which is a voltage to be applied to each of motor coils. The reference numerals 45a, 45b and 45c designate Hall elements which are arranged so as to be separated from each other by 120 degrees in electrical angle. The reference numeral 145 designates the output signals of the Hall elements. The reference numerals 46a, 46b and 46c designate motor coils which are arranged so as to be separated from each other by 120 degrees in electrical angle. The reference numeral 47 designates a magnet in which each of north and south (N and S) poles is provided in a fan shape; 48, a back yoke of the magnet 47; 49, a frequency-to-voltage converter for converting a frequency into a voltage; and 149, an output signal of the frequency-to-voltage converter 49.

FIG. 2 shows waveforms of signals at various portions of the above-mentioned three-phase brushless servo motor. In FIGS. 2, (a), (b) and (c) show the encoder output signal 142, the converter output signal 149, and the Hall element output signal 145 in FIG. 1 respectively, and (d-1), (d-2) and (d-3) each shows the motor coil application voltage 144 in FIG. 1 respectively.

Referring to FIGS. 1 and 2, the operation of the above-mentioned conventional three-phase brushless servo motor will be described. In FIG. 1, when the brushless motor 41 rotates, the rotary disk 42a inside the rotational speed detecting encoder 42 is rotated through the connector 43 so that the slits 42b successively pass between the light emission element 42c and the light detection element 42d. Accordingly, the rotational speed detecting encoder 42 generates a pulse waveform as shown in (a) of FIG. 2. The frequency of this pulse signal is proportional to the rotational speed of the motor. By means of the frequency-to-voltage converter 49, the frequency of this pulse signal is converted into a voltage which is information of the rotational speed of the brushless motor 41 and which has a waveform as shown in (b) of FIG. 2.

Further, when the brushless motor 41 rotates, the Hall elements 45a, 45b and 45c generate Hall element output signals 145 which show three-phase signal waveforms which are shifted in phase from each other by 120 degrees in electrical angle as shown in (c) of FIG. 2. The Hall element output signals 145 are supplied to the motor driving circuit 44 so as to be used for timing setting of the output signal of the motor driving circuit 44, as shown in (d-1) of FIG. 2, that is, the motor coil application voltage 144. The level of the motor coil application voltage 144 is controlled by the converter output signal 149 which is rotational speed information so that the level is made low as shown in (d-3) of FIG. 2 when the motor speed is high, while it is made high as shown in (d-2) of FIG. 2 when the motor speed is low. According, the brushless motor 41 can keep its speed constant.

Thus, in the above-mentioned conventional three-phase brushless servo motor, a constant speed servo is realized by a combination of the rotational speed detecting encoder 42 and the brushless motor 41.

In the above-mentioned conventional brushless servo motor, however, there has been a serious problem that an expensive rotational speed detecting encoder is required so that the cost of the motor is high and the shape of the motor becomes large by a space corresponding to the detector and the connector.

SUMMARY OF THE INVENTION

The present invention has been attained to solve the above problem in the conventional case and an object of the present invention is to provide an inexpensive and small-sized three-phase brushless servo motor in which such an expensive rotational speed detecting encoder is not required.

In order to attain the above object, according to an aspect of the present invention, the three-phase brushless servo motor comprises: waveform processing means for processing waveforms of three-phase Hall element signals which are shifted in phase from each other by 120 degrees in electrical angle; and motor driving means which uses a processed signal from the waveform processing means as a rotational position signal for servo.

In the above three-phase brushless servo motor, preferably, the waveform processing means includes: logical operation means for comparing two phases of each of three sets each containing two phases selected from the three-phase Hall element signals; a selection table in which results of logical operation of the three sets are put so as to correspond to six-phase signals including the three-phase Hall element signals and inverted ones of the three-phase Hall element signals; and differentiation means for differentiating a waveform selected on the basis of the selection table.

In the above three-phase brushless servo motor, preferably, the waveform processing means includes: comparison means for comparing the three-phase Hall element signals; a selection table in which results of comparison of the comparison means are put so as to correspond to six-phase signals including the three-phase Hall element signals and inverted ones of the three-phase Hall element signals; and a differentiation means for differentiating a waveform selected on the basis of the selection table.

In the above three-phase brushless servo motor, alternatively, the waveform selected on the basis of the selection table is used, without being differentiated, as a rotational position signal of the servo motor. This is because since the processed signal from the waveform processing means indicates the rotational position of the motor, the rotational position control of the motor can be realized with no differentiation circuit.

In the three-phase brushless servo motor according to the present invention, by the above configuration, the Hall element signals are used as servo rotational position signals so that no expensive rotational speed detecting encoder is required.

BRIEF DESCRIPTION OF THE DRAWINGS

FIG. 4 is a view of waveforms of signals at various portions of the embodiment of the three-phase brushless servo motor for explanation of the operation thereof.

DESCRIPTION OF THE PREFERRED EMBODIMENTS

Figure 1:
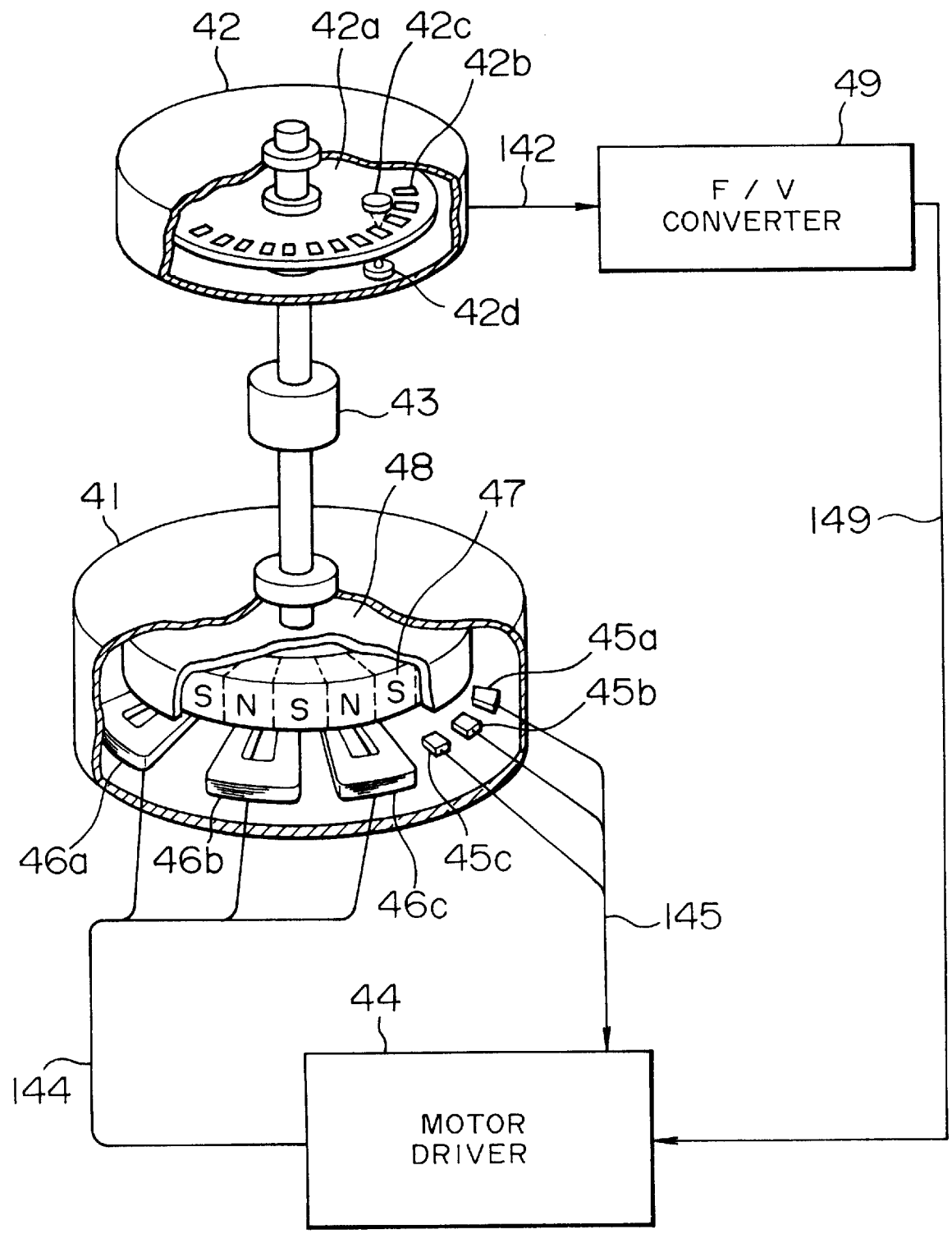
FIG. 1 is a configuration view of a conventional three-phase brushless servo motor.
Figure 2:
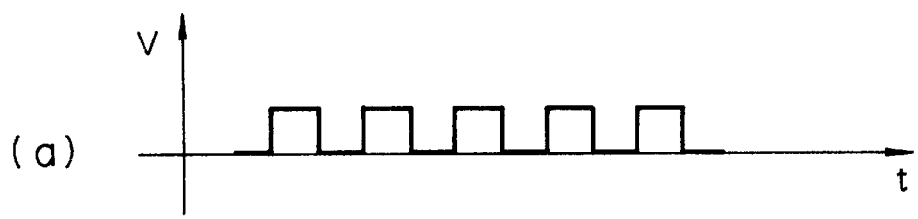
FIG. 2 is a view of waveforms of signals at various portions of the conventional three-phase brushless servo motor for explanation of the operation thereof.
Figure 2:
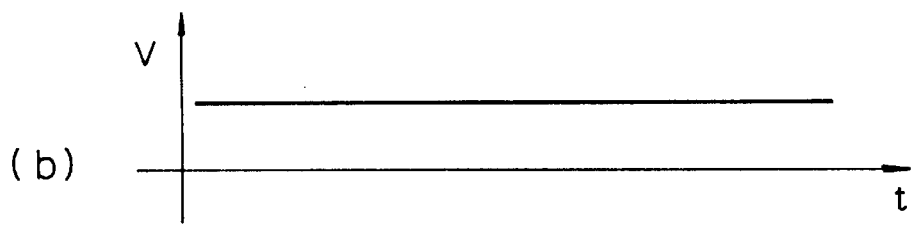
Figure 2:
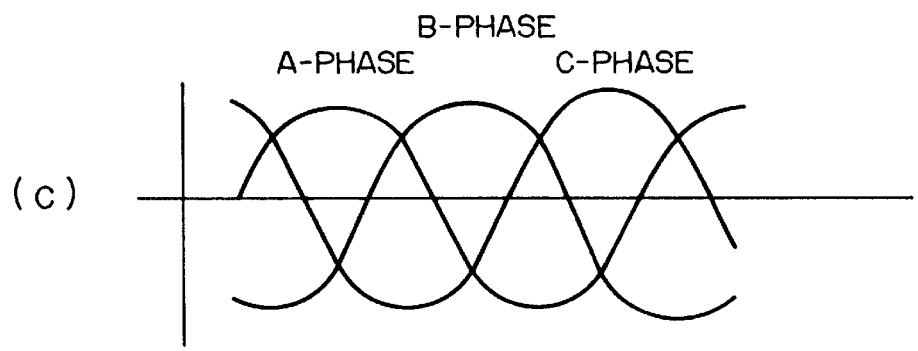
Figure 2:
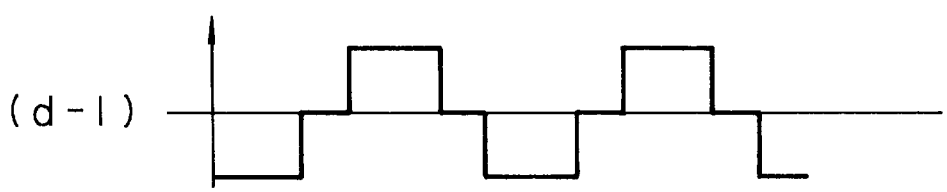
Figure 2:
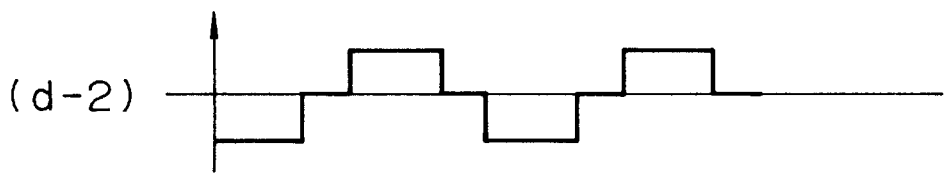
Figure 2:
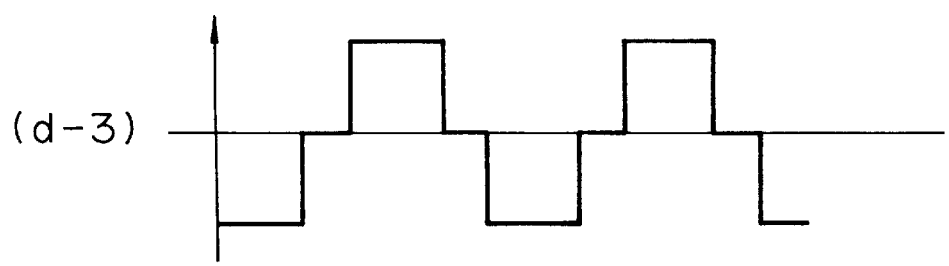

Referring to the drawings, embodiments of the present invention will be described below.

Figure 3:
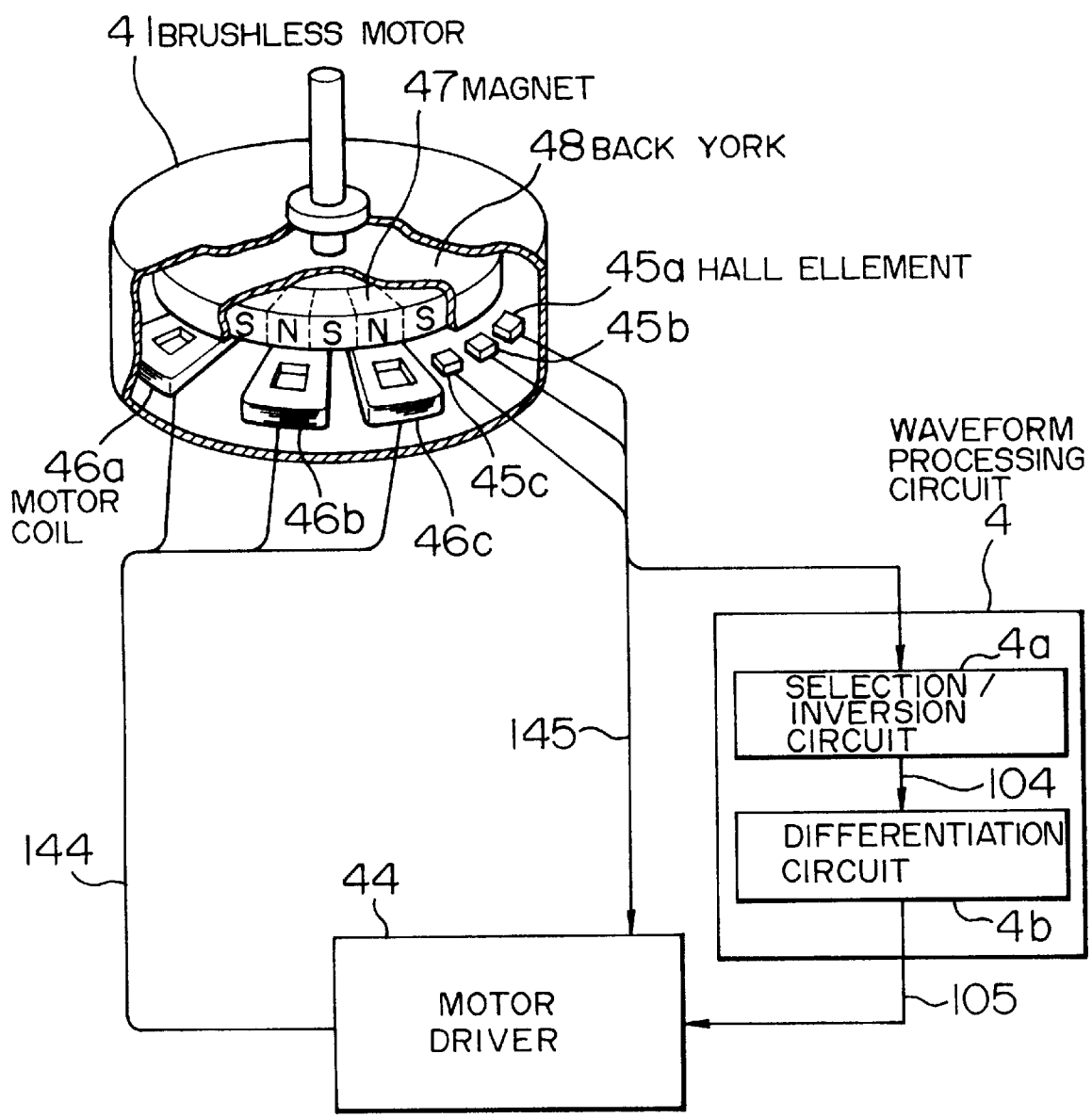
FIG. 3 is a configuration view of an embodiment of the three-phase brushless servo motor according to the present invention.

FIG. 3 is a configuration view of an embodiment of the three-phase brushless servo motor according to the present invention, in which members the same as those described in FIG. 1 are referenced correspondingly and detailed description thereof is omitted here. In FIG. 3, the reference numeral 4 designates a waveform processing circuit; 4a, a selection/inversion circuit which is logical operation means; 4b, a differentiation circuit; 104, an output signal of the selection/inversion circuit 4a; and 105, an output circuit of the differentiation circuit 4b.

FIG. 4 is a view of waveforms of signals at various portions of the above-mentioned three-phase brushless servo motor, in which (a), (b) and (c) are the Hall element output signal 145, the selection/inversion circuit output signal 104, and the motor coil application voltage 144 in FIG. 3, and (d-1), (d-2) and (d-3) are logics respectively processed in the selection/inversion circuit 4a in FIG. 3.

Referring to FIGS. 3 and 4, the operation of the thus configured three-phase brushless servo motor according to this embodiment will be described below.

First, when the magnet 47 of the brushless motor 41 rotates, similarly to the conventional case, the Hall elements 45a, 45b and 45c generate three-phase signal waveforms shifted in phase from each other by 120 degrees in electrical angle as shown in (a) of FIG. 4. The Hall element output signals 145 are supplied not only to the motor driving circuit 44 similarly to the conventional case but also to the waveform processing circuit 4.

In the selection/inversion circuit 4a, logical operation as for the three bits is performed on the basis of comparison among the above-mentioned three-phase signal waveforms as shown in (d-1), (d-2) and (d-3) of FIG. 4, and a phase to be selected from six phases in total of the signal waveforms which include the above-mentioned three phases and the inverted ones of those three phases is defined from the logics among the three bits as shown in the following Diagram 1.

| | | | | | | | |
|---|---|---|---|---|---|---|---|
| | Diagram 1 | | | | | | |
| phase | Bit 0 | 1 | 1 | 1 | 0 | 0 | 0 |
| selection | Bit 1 | 0 | 0 | 1 | 1 | 1 | 0 |
| logic | Bit 2 | 1 | 0 | 0 | 0 | 1 | 1 |
| phase to be selected | | A | $\bar{C}$ | B | $\bar{A}$ | C | $\bar{B}$ |

The continuous waveform of the phases selected by the above-mentioned definition becomes a saw-tooth-wave as shown in (b) of FIG. 4. As shown in the drawing, from the three-phase approximate triangular waves each having a gentle peak ((a) of FIG. 4), this saw-tooth-wave is obtained by continuously selecting approximately straight line portions in the vicinity of zero-cross points. Since the above-mentioned three-phase signal waveforms are obtained by detecting the rotating magnet 47 by means of the Hall elements 45a, 45b and 45c, the inclination of the above-mentioned approximately straight line portions indicates the motor speed. The above-mentioned continuous waveform of the saw-tooth-wave is supplied to the differentiation circuit 4b so as to be differentiated to thereby produce a voltage (c) corresponding to the inclination.

As seen from FIGS. 3 and 4, in the brushless servo motor according to this embodiment, it is possible to obtain an effect superior in the point that speed information can be obtained even if there is no rotational speed detector provided.

In the above embodiment, although description has been made as to a case where phase selection is defined in such a manner as shown in the Diagram 1 to thereby produce a saw-tooth-wave, the definition of selection may be performed by any other method. As an example of the other definition of phase selection, the definition of taking out a saw-tooth-wave from the above-mentioned three-phase Hall element signal waveforms is shown in the following Diagram 2.

| | | | | | | |
|---|---|---|---|---|---|---|
| | Diagram 2 | | | | | |
| phase of higher rank level | C | A | A | B | B | C |
| phase of middle rank level | A | C | B | A | C | B |
| phase of lower rank level | B | B | C | C | A | A |
| phase to be selected | A | $\bar{C}$ | B | $\bar{A}$ | C | $\bar{B}$ |

The selection method according to Diagram 2 is a definition such that the respective levels of the three-phase Hall element signals are compared so as to make a permutation in which the phase of higher rank level, the phase of middle rank level, and the phase of lower rank level are arranged in order, and one phase is selected from six phases in total of the signal waveforms which include the above-mentioned three phases and the inverted ones of those three phases.

Since the last-mentioned saw-tooth-wave indicated the rotational position of the motor, it is possible to carry out the rotational position control of the motor on the basis of the saw-tooth-wave even if the above-mention differentiation circuit 4b is not provided.

According to this embodiment, as described above, it is possible to obtain speed information by processing the three-phase Hall element signals to carry out a servo motor even if such a rotational speed detector as used conventionally is not provided.

According to the present invention, as described above, a rotational position signal for servo operation can be obtained by provision of a waveform processing means for processing signals of Hall elements which is indispensable to a brushless motor, so that it is possible to eliminate a rotational speed detection encoder to thereby realize an inexpensive and small-sized three-phase brushless servo motor.

what is claimed is:

1. A three-phase brushless servo motor comprising:
   waveform processing means for providing an output signal based on processing waveforms of three-phase Hall element signals which are shifted in phase from each other by 120 degrees in electrical angle, said processing including a logical operation performed on said three-phase Hall element signals; and
   motor driving means for using said output signal from said waveform processing means as a rotational position signal for servo.

2. A three-phase brushless servo motor according to claim 1, wherein said logical operation includes comparison of said three-phase Hall element signals and selection of a phase among six phases, corresponding to different waveforms of said output signal, said six phases including three phases and inverted ones of said three phases.

3. A three-phase brushless servo motor according to claim 2, wherein a waveform associated with said selected phase is used, without being differentiated, as said rotational position signal for servo.

4. A three-phase brushless servo motor according to claim 2, wherein said comparison includes comparing said three-phase Hall element signals to perform a permutation of a phase of higher rank level, a phase of middle rank level and a phase of lower rank level in order.

5. A three-phase brushless servo motor according to claim 2, wherein said comparison includes comparing two phases of each of three sets each containing two phases selected from said three-phase Hall element signals.

6. A three-phase brushless servo motor comprising:
waveform processing means for providing an output signal based on processing waveforms of three-phase Hall element signals which are shifted in phase from each other by 120 degrees in electrical angle; and motor driving means for using said output signal from said waveform processing means as a rotational position signal for servo, wherein said waveform processing means includes: logical operation means for comparing two phases of each of three sets each containing two phases selected from the three-phase Hall element signals; a selection table in which results of logical operation of said three sets are put so as to correspond to six-phase signals including said three-phase Hall element signals and inverted ones of said three-phase Hall element signals; and differentiation means for differentiating a waveform selected on the basis of said selection table.

7. A three-phase brushless servo motor comprising:
waveform processing means for providing an output signal based on processing waveforms of three-phase Hall element signals which are shifted in phase from each other by 120 degrees in electrical angle; and
motor driving means for using said output signal from said waveform processing means as a rotational position signal for servo, wherein said waveform processing means includes: comparison means for comparing said three-phase Hall element signals; a selection table in which results of comparison of said comparison means are put so as to correspond to six-phase signals including said three-phase Hall element signals and inverted ones of said three-phase Hall element signals; and differentiation means for differentiating a waveform selected on the basis of said selection table.

8. A three-phase brushless servo motor comprising:
waveform processing means for providing an output signal based on processing waveforms of three-phase Hall element signals which are shifted in phase from each other by 120 degrees in electrical angle; and
motor driving means for using said output signal from said waveform processing means as a rotational position signal for servo, wherein said waveform processing means includes: logical operation means for comparing two phases of each of three sets each containing two phases selected from the three-phase Hall element signals; and a selection table in which results of logical operation of said three sets are put so as to correspond to six-phase signals including said three-phase Hall element signals and inverted ones of said three-phase Hall element signals, wherein the waveform selected on the basis of said selection table is used, without being differentiated, as said rotational position signal for servo.

9. A three-phase brushless servo motor comprising:
waveform processing means for providing an output signal based on processing waveforms of three-phase Hall element signals which are shifted in phase from each other by 120 degrees in electrical angle; and
motor driving means for using said output signal from said waveform processing means as a rotational position signal for servo, wherein said waveform processing means includes: comparison means for comparing said three-phase Hall element signals: and a selection table in which results of comparison of said comparison means are put so as to correspond to six-phase signals including said three-phase Hall element signals and inverted ones of said three-phase Hall element signals, wherein the waveform selected on the basis of said selection table is used, without being differentiated, as said rotational position signal for servo.

* * * * *